US012762897B1

(12) United States Patent
Huang

(10) Patent No.: US 12,762,897 B1
(45) Date of Patent: Oct. 13, 2026

(54) SYSTEM TO MODEL MOTION WITH PREDICTIVE AI MODELS

(71) Applicant: Chengjie Huang, Doral, FL (US)

(72) Inventor: Chengjie Huang, Doral, FL (US)

( * ) Notice: Subject to any disclaimer, the term of this patent is extended or adjusted under 35 U.S.C. 154(b) by 0 days.

(21) Appl. No.: 19/368,113

(22) Filed: Oct. 24, 2025

Related U.S. Application Data

(63) Continuation-in-part of application No. 19/003,705, filed on Dec. 27, 2024, now abandoned.

(51) Int. Cl.
*G06V 40/20* (2022.01)
*G06V 10/82* (2022.01)

(52) U.S. Cl.
CPC .............. *G06V 40/23* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 10,576,380 | B1 * | 3/2020 | Beltran | A63F 13/67 |
| 10,776,692 | B2 * | 9/2020 | Lillicrap | G06N 3/006 |
| 12,524,495 | B2 * | 1/2026 | Qi | G06F 18/2148 |
| 2022/0180026 | A1 * | 6/2022 | Barat | G06F 30/27 |
| 2022/0362675 | A1 | 11/2022 | Osman et al. | |
| 2024/0135618 | A1 * | 4/2024 | Zhang | G06T 13/40 |
| 2024/0153188 | A1 | 5/2024 | Wang et al. | |
| 2024/0203013 | A1 | 6/2024 | Hwang et al. | |
| 2025/0064671 | A1 * | 2/2025 | Kuncewicz | A61H 19/00 |
| 2025/0238673 | A1 * | 7/2025 | Commons | G06N 3/09 |
| 2025/0252315 | A1 * | 8/2025 | Xie | G06N 3/006 |
| 2025/0371873 | A1 * | 12/2025 | Chiu | G06V 10/44 |

FOREIGN PATENT DOCUMENTS

CN 117883788 A 4/2024

OTHER PUBLICATIONS

Chen, Zhao, and Darvin Yi. "The game imitation: Deep supervised convolutional networks for quick video game AI." arXiv preprint arXiv:1702.05663 (2017). (Year: 2017).*

(Continued)

*Primary Examiner* — Samah A Beg
(74) *Attorney, Agent, or Firm* — Sanchelima & Associates, P.A.; Christian Sanchelima; Jesus Sanchelima

(57) ABSTRACT

The present invention relates to a system for training artificial intelligence models to generate human-like motion decisions in interactive environments. The system incorporates multiple neural network architectures to model fast action movement decisions and less active movement flows in sports, as well as AI networks that direct how to switch between different movement states. Ordinary differential equation networks model hidden state changes over time, allowing sparse sampling and sparse inferences. This system uses fast transformer networks to forecast into the future and outpace real time, allowing additional time for complex calculations of intelligent decisions. Future forecasts allow networks to anticipate opponent movements furthering its intelligence and capabilities. This technology has applications in sports simulation, animation, and automated systems requiring human-like motion intelligence.

10 Claims, 9 Drawing Sheets

(56) References Cited

OTHER PUBLICATIONS

Park, Soohwan, et al. "Learning predict-and-simulate policies from unorganized human motion data." ACM Transactions on Graphics (TOG) 38.6 (2019): 1-11. (Year: 2019).*
Wei, Xiang, et al. "Learning motion rules from real data: Neural network for crowd simulation." Neurocomputing 310 (2018): 125-134. (Year: 2018).*
Nakandala, Supun, et al. "Application of convolutional neural network algorithms for advancing sedentary and activity bout classification." Journal for the Measurement of Physical Behaviour 4.2 (2021): 102-110. (Year: 2021).*
Yang, Zhaoyang, et al. "Hierarchical deep reinforcement learning for continuous action control." IEEE transactions on neural networks and learning systems 29.11 (2018): 5174-5184. (Year: 2018).*
Martinez, Julieta, Michael J. Black, and Javier Romero. "On human motion prediction using recurrent neural networks." Proceedings of the IEEE conference on computer vision and pattern recognition. 2017. (Year: 2017).*

* cited by examiner $$\frac{d\,h(t)}{d\,t} = F\,(\,h(t),\ I(t),\ t\ ;\ \theta_{ODE}) \quad 601$$

$$h(t_2,t_1) = h(t_1) + \int_{t_1}^{t_2} F\,(\,h(t),\ I(t),\ t\ ;\ \theta_{ODE})dt \quad 602$$

$$\lambda(t) = g\,(\,h(t);\,\theta_h)$$ 807

$$\lambda(t) = softplus\,(\,W_h h(t) + b_h)$$ 808

$$Su(t) = e^{-\int_{t_0}^{t}\lambda(\omega)d\omega}$$ 809

$$\rho(T = t \mid h(t_0)) = \lambda(t)Su(t)$$ 810

$$L = -\sum_i log\,\rho(T = t_i \mid h(t_i - 1)$$ 811

SYSTEM TO MODEL MOTION WITH PREDICTIVE AI MODELS

OTHER RELATED APPLICATIONS

The present application is a continuation-in-part of pending U.S. patent application Ser. No. 19/003,705, filed on Dec. 27, 2024, which is hereby incorporated by reference.

BACKGROUND OF THE INVENTION

Field of the Invention

The present invention relates to a system to train Motion Neural Network (MNN) models that mimic a person's decision processes in motion. Such decisions are often made in the context of the movements of other actors. This involves training AI algorithms on coordinates and vectors of athletes through motion capture or video processing, such that given a state of athletes and opponents in motion, the AI network proposes or predicts a future state of action. In one aspect, this invention maintains multiple AI networks that model active and passive states of sports motion and how athletes transition between states. This hybrid AI system uses continuous-time ordinary differential equation and transformer networks.

Description of the Related Art

The motion of human bodies in the digital medium began with early film. Through the development of advanced technologies like motion capture, CGI, and real-time rendering, the lines between reality and digital representations blurred, creating immersive experiences. These technologies intersect with Artificial Intelligence, enhancing realism and efficiency in digital media. In animation and sports simulation, AI-driven algorithms enable real-time character movements and interactions, creating dynamic and lifelike environments.

However, AI in animation and gaming lacks autonomy. Non-player characters in games follow hard-coded scripts. Some patents are relevant to this art. Applicant believes that a related reference corresponds to U.S. patent No. 20220362675 A1 issued for an AI model for automatic control of characters during game plays of gaming applications. It claims through a deep learning engine to build an artificial intelligence model, but does not provide detailed methods of how to create such a model.

Other related arts address 3D motion AI in sports and film. Applicant believes that a related reference corresponds to U.S. patent No. 20240203013 issued for an AI system to control 3D motion agents. Applicant believes that another related reference corresponds to U.S. patent No. 20240153188 issued for physics-based simulation of human motion using generative AI. Applicant further believes that another related reference corresponds to U.S. patent No. 20240135618 issued for training AI agents for realistic motion simulation using broadcast videos. None of these references, however, teach a method to autonomously generate motion decisions based on concurrent movements of other actors. Furthermore, the referenced arts do not consider a system that maintains memory of previous actions and transitions between active decisions and passive movement flows.

Another related reference is CN patent No. 117883788 A to TENCENT TECHNOLOGY CO LTD, which discloses an intelligent agent training method, a game battle method, a device and an electronic device, and relates to the technical fields of artificial intelligence and online games. Through the initial agent, perform at least one control operation on the game character in at least one game of the target game. There are significant differences in the domain of application, with the current reference being focused on online gaming environments, while the Present invention pertains to sports simulations and robotics. The technical implementations also differ, with the present invention describing a multi-level hybrid system with model specifications novel to the prior art. Furthermore, the present invention models a system of numerical coordinates and movement vectors in physical space. The domain of this prior patent address game controller inputs such as button presses and keystrokes in game spaces.

Applicant believes another related reference is U.S. patent Ser. No. 10/576,380 B1 to Sony Interactive Entertainment LLC, which discloses a method for processing an artificial intelligence (AI) model for a gaming application. The method includes training the AI model from a plurality of game plays of a scenario of the gaming application using training state data collected from the plurality of game plays of the scenario and associated success criteria of each of the plurality of game plays. The method includes receiving first input state data during a first game play of the scenario. The method includes applying the first input state data to the AI model to generate an output indicating a degree of success for the scenario for the first game play. The method includes performing an analysis of the output based on a predefined objective and an action to achieve such objective. However, there are notable differences in the application domain, specific AI techniques, and models. The patent is more focused on cloud gaming applications and general AI model training, while the present invention extends to physical coordinates and vectors modeling.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a system to train an AI Motion Neural Network (MNN) model that takes the past and current states of movements as input, predicts future movements, and generates intelligent movement proposals.

It is another object of this invention to train AI networks that encode movement time, vectors, and coordinates into a hidden state that acts as a working memory of a motion system.

It is another object of this invention to maintain multiple AI networks that govern different aspects of one individual's movement.

It is yet another object of this invention to maintain continuous time differential equation neural networks to model significant actions and less complex neural networks to model action flows without significant decision making.

It is yet another object of this invention to partition data and models into active decisions and passive movements through threshold acceleration values.

It is another object of this invention to model the sequences of action periods via AI network to predict the length of time to next significant action.

It is yet another object of this invention for the models predict change in hidden state as a function of inputs and AI-trained parameters.

It is still another object of this invention to decode the predicted hidden states through linear functions or Multi-Layer Perceptron network into physical coordinates and vectors that instruct the motions of a simulated character or a robot.

It is another object of this invention to model future motion states with fast lightweight networks in real time such that the prediction speed outpaces progression of normal time.

It is still another object of this invention to consider future states and to model one or more movement decisions, and to complete such MNN calculations before real progression of time arrive at said future state time.

It is yet another object of this invention to model the hidden states of other actors into the future and train MNNs that not only take the past and current states but also possible future states as input.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Some embodiments of this disclosure, illustrating all its features, will now be discussed in detail. The words "comprising", "having", "containing", and "including", and other forms thereof, are intended to be open ended in that an item or items following any one of these words is not meant to be exhaustive listing of such item or items, or meant to be limited to only the listed item or items.

It should also be noted that as used herein and in the appended claims, the singular forms "a", "an" and "the" include plural references unless the context clearly dictates otherwise. Although any systems and methods similar or equivalent to those described herein can be used in the practice or testing of various embodiments of the present disclosure, various embodiments of the systems and methods will be described.

Embodiments of the present disclosure will be described more fully hereinafter with reference to the accompanying drawings in which like numerals may represent like elements throughout the several figures, and in which various exemplary embodiments are shown. Various embodiments may, however, be embodied in many different forms and should not be constructed as limited to the embodiments set forth herein. In some instances well-known circuits, structures and/or techniques have not been shown or described in detail as these are known to one skilled in the art. Therefore, specific details disclosed herein are not to be interpreted as limiting, but rather as a basis and/or principle for the claims, and/or as representative basis for teaching one skilled in the art to employ this invention in virtually appropriately detailed system, structure, or matter.

Figure 1:
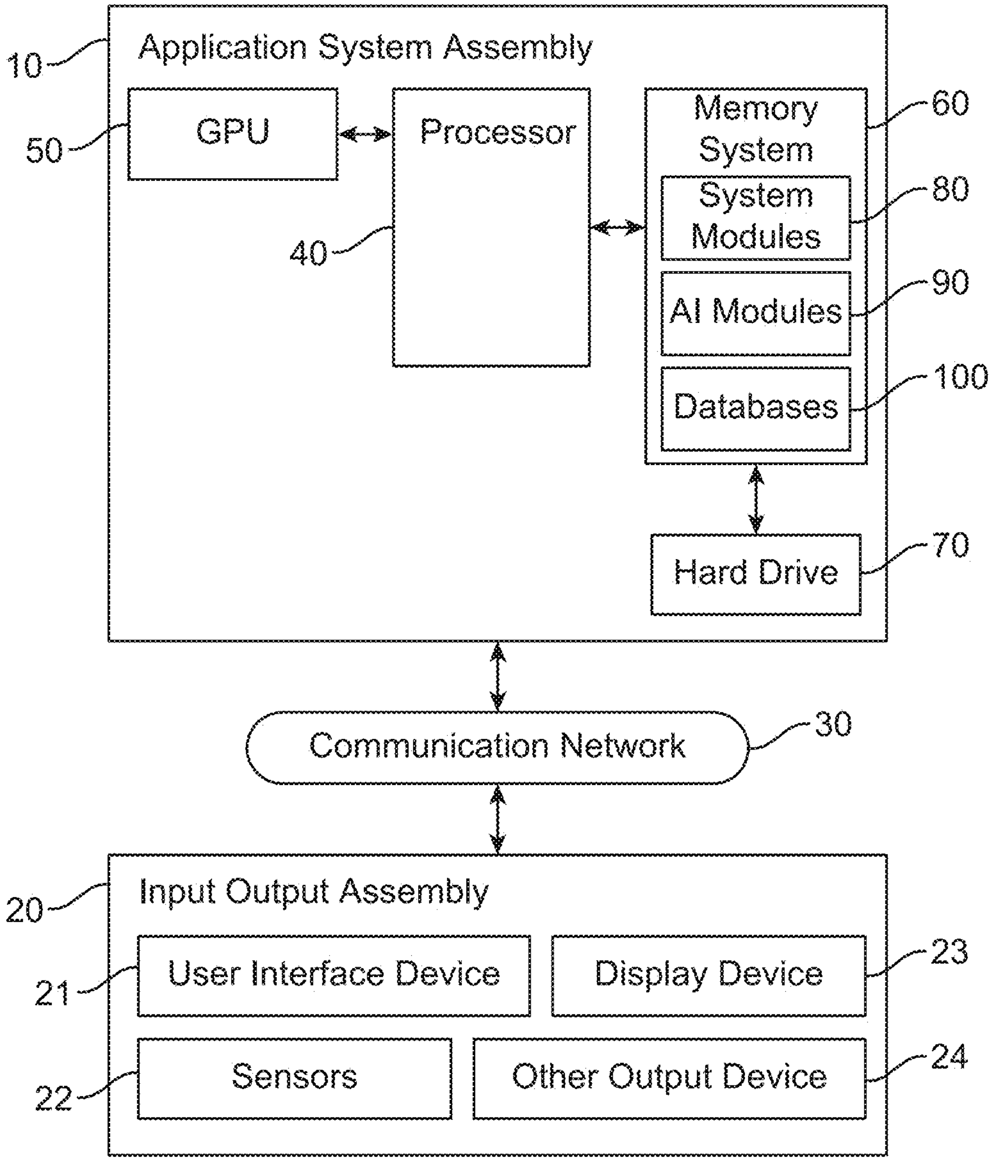
FIG. 1 represents a network diagram of an application system assembly via a cloud network in communication with user input and output devices.

As best illustrated in FIG. 1, a computerized application system assembly 10 connects to an input/output assembly 20 through a communication network 30. The communication network 30 may include multiple embodiments such as local wired and wireless network, wireless data communication, LTE, 5G, 6G, or any appropriate communication network known in the art. The application system assembly 10 may be housed on a server or a local computing device. It may include a processor 40, a GPU 50, a memory 60, and a data hard drive 70. The processor 40 may include a computerized device for executing instructions, processes, calculations, communicating with devices, and other tasks relevant to this embodiment. The GPU 50, or similar devices known to the art, may render data into images, videos, and VR objects, as well as perform neural network (NN) model calculations. It may be preferable for the memory 60 to include system modules 80, AI modules 90 and databases 100. System modules 80 and AI modules 90 are further elaborated in the FIG. 2. Databases 100 may include actor mesh coordinates, environment and object mesh coordinates, video data, MNNs, user data, user-trained MNNs, and other data relevant to the art. It should be understood the data hard drive 70 may include temporary or permanent storage in the form of a data drive. In a preferred embodiment, the input/output assembly 20 may include user interface devices 21, sensors 22, display device 23, and other output devices 24. User Interface devices 21 and display devices 23 may be commonly paired and may include computerized devices in handheld, tablet, laptop, and other forms, as well as sport simulation consoles and VR, AR, and Mixed Reality devices. Sensors 22 may include nodes worn by persons, attached to objects, audio, video, and other waveform-capturing devices for spatial mapping. Other output devices 24 may include sports equipment and robots.

Figure 2:
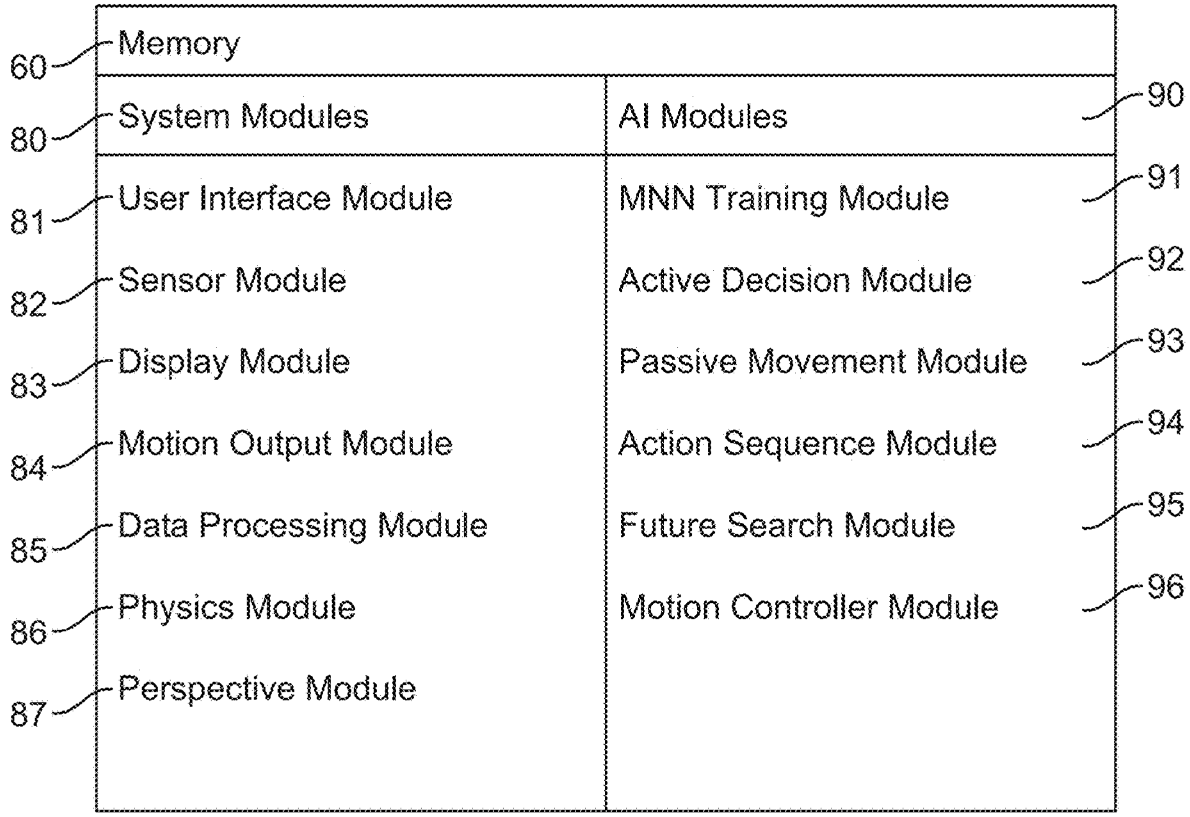
FIG. 2 shows an overview of the memory modules of the application system.
Figure 7:
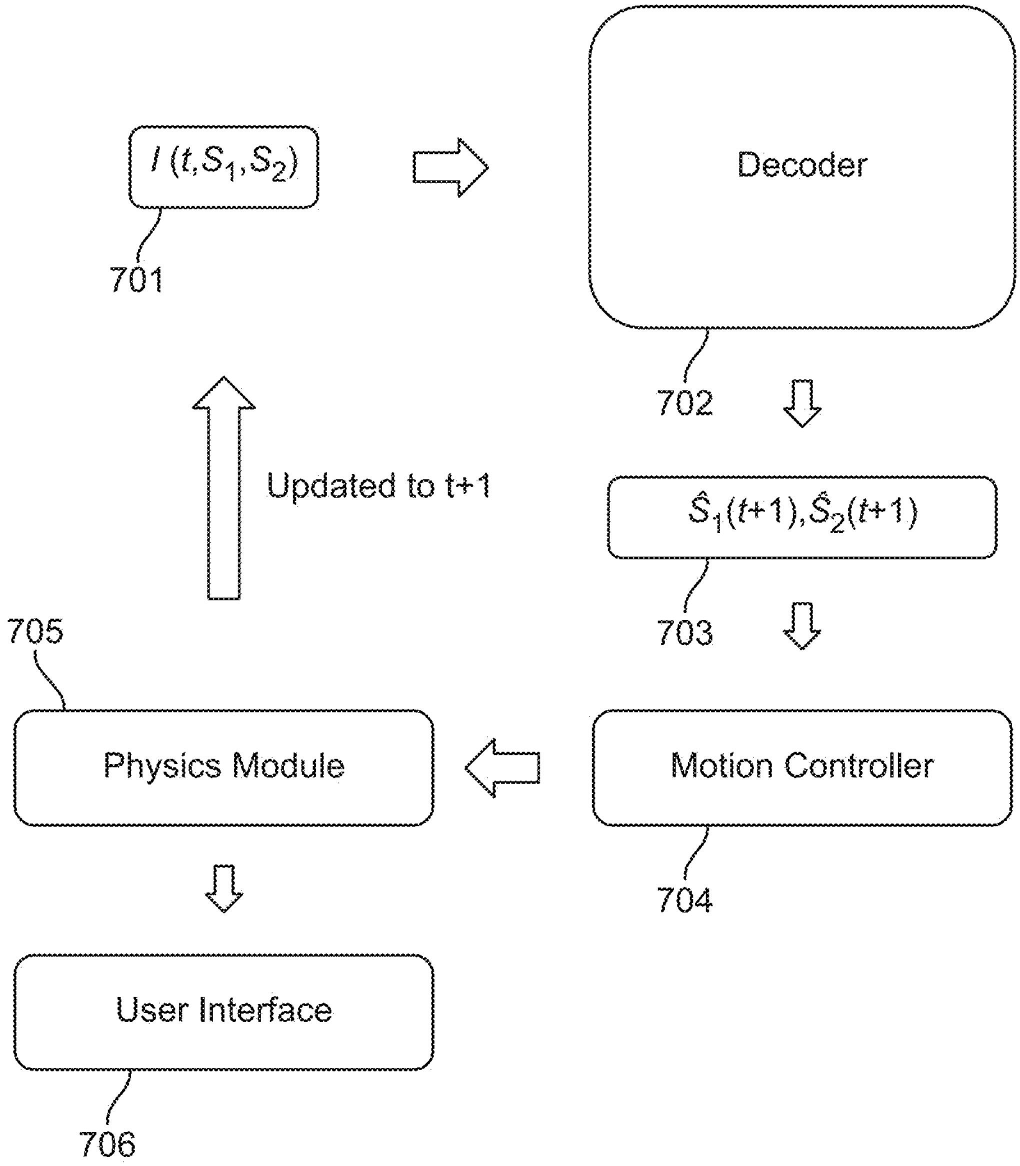
FIG. 7 shows a diagram of a Transformer Network structure.
Figure 8:
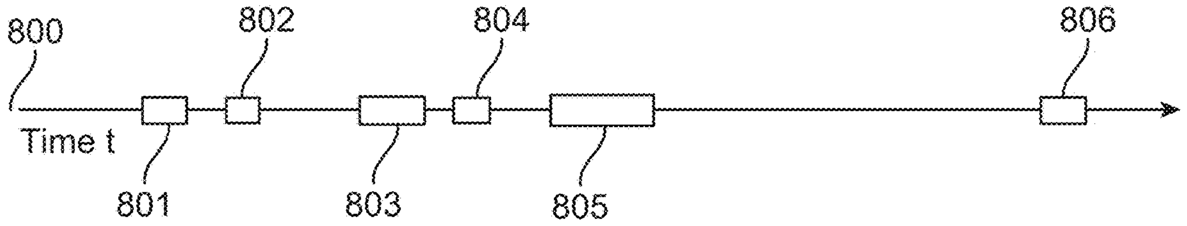
FIG. 8 illustrates a timeline sequence of significant actions and hazard head equations to model when the next significant action will likely occur.

FIG. 2 depicts system modules 80 which may include a User Interface Module 81, a Sensor Module 82, a Display Module 83, a Motion Output Module 84, a Data-processing Module 85, a Physics Module 86, and a Perspective Module 87 and AI Modules 90 which may include a MNN Training Module 91, an Active Decision Module 92, a Passive Movement Module 93, an Action Sequence Module 94, Future Forecast Module 95, and a Motion Controller Module 96. The User Interface Module 81 may be used for input through devices including keyboard, mouse, voice microphone, game controller, and other known input instruments. The Sensor Module 82 may receive movement data from on-person sensors, environment sensors, object detection sensors, eye-tracking sensors, and other motion-tracking sensors. The Display Module 83 may translate the movements of human and AI actors and other objects and render the environment onto a display device such as a screen, VR/AR device, or holographic display. The Motion Output Module 84 may control an external device such as robots, sports instruments, and environment objects. Data Processing Module 85 processes movements in historical videos, recorded sessions, and user sessions into data in the format of MNN inputs. Some user devices may provide physical data that require minimal editing. Other data in video form may require complex Computer Vision software and AI networks to transform into physical data. Such processes are available in open source and known to those versed in the arts. Physics Module 86 as shown in FIG. 7 processes movement data and may filter, modify, or reject movements depending on the physical rules of reality. Collisions may be detected and resolved. Final accepted actions update the system of actor states. Perspective Module 87 may maintain and update the subsets of the system as perceived by each actor. Though highly complex, Physics Engines are well-known in the arts and are available in open-source applications. Physics Module 86 and Perspective Module 87 may be powered by a Physics Engine applications. MNN Training Module 91 may train AI networks through equations and structures shown in FIGS. 7, 8, and 9. Detail specifications are discussed further. Action Decision Module 92 directs significant actions through its trained models which are likely to generate significant movement vectors. Passive Movement Module 93 directs periods of movements when acceleration vectors are less than a certain threshold activity. Specifications are further discussed with FIGS. 4, 8, and 9. Action Sequence Module 94 houses networks that predict the timing of next significant action. Future Forecast Module 95 forecasts motion states into future time frames and processes MNNs using these future states. It anticipates, predicts, and plans motion strategies. Motion Controller Module 96 decodes MNN hidden states into physical coordinates and vectors. It directs other AI modules and may receive multiple movement proposals such as an active movement, a defensive movement, a passive movement, or a planned future movement. It informs movement proposals through network to other assemblies then updates other AI modules to the new hidden state with final real time decisions.

Figure 3:
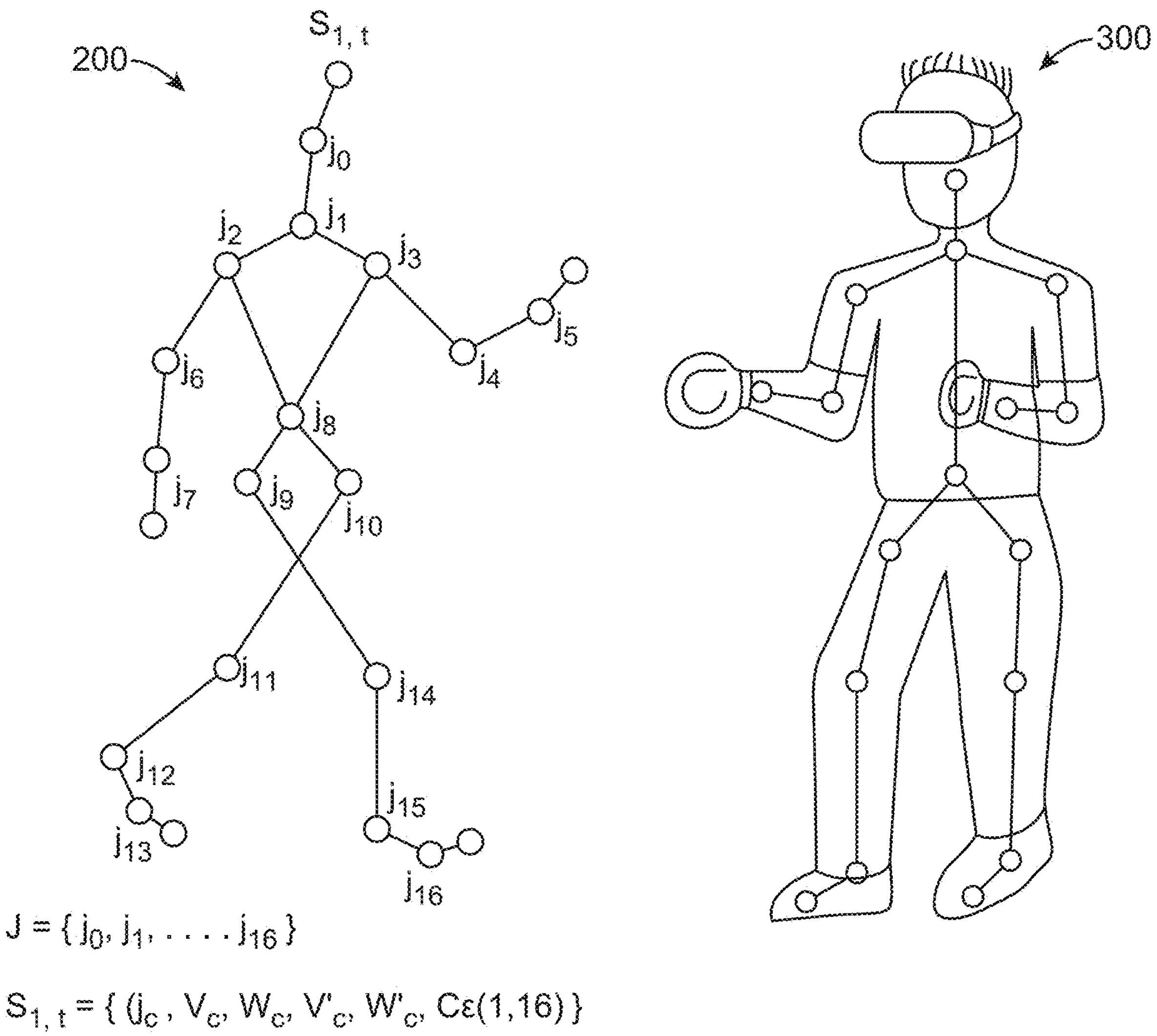
FIG. 3 represents a body coordinates map of an actor and its data representation of coordinates and motion.

FIG. 3 illustrates the motion data of actor 1 200 at time=t. Example represents an actor $$\text{state } S_{1,t} = \{(j_c, v_c, w_c, v'_c, w'_c)\colon c\epsilon(1, n)\}\colon$$

$j_c$: body position of point c in the x, y, z coordinate system.

$v_c$: linear velocity of point c $w_c$: angular velocity of point c $v'_c$: linear acceleration of point c $w'_c$: angular acceleration of point c In this example, system maintains n=16 body coordinates. An actor action $A_{1,t}$ may be represented by the acceleration vectors $\{(v'_c, w'_c)\colon c\varepsilon(1, n)\}$. Alternatively, an action may also be represented by the change in velocity vectors $$\frac{dv}{dt}.$$

In one embodiment, MNNs takes an input $I(t, s_1, s_2)$ of action states with a context length of l, measured in frames, which may be for example 96 frames per second.

$$I(t, s_1, s_2) = \left\{s_k\colon j_{c,t}, v_{c,t}, w_{c,t}, \ldots\ j_{c,t-l}, v_{c,t-l}, w_{c,t-l}\right\}, k = 1, 2, c\epsilon(1, n) \quad 1$$

This data array includes the body coordinates and velocity of a time length l, but not acceleration values explicitly. The change in velocity sufficiently represents acceleration and informs the MNNs any significant action. Athletes make decisions depending on the action states preceding that point. The optimal length can depend on the sport, processing speed of system hardware, and the desired level of intelligence. For an application of this invention, different lengths can be tested in training and inference, and optimal length then selected.

The example lists actor 1 with n=16 points and their coordinate positions at time=t. Primary actor 1 may be a simulated actor in virtual space. Its movements are governed by embodied MNNs. Another actor 2 300 wears VR gear and engages with virtual actor 1 in a match. One primary application of this invention is to direct a simulated or robotic actor in real time against real or simulated opponents. Intelligent movement choices may require complex calculations. If decisions cannot keep pace with real progression of time, then such decisions may have limited utility. Embodiments maintain multiple MNNs. Lightweight networks can be fast and model next physical states. Complex networks can maintain hidden memories and model short and long-term dependencies on movement data from all relevant actors. Input Equation 1 for example includes data from both actors. Future Forecast networks can process not only the past and current actions of actors but also likely future actions.

Figure 4:
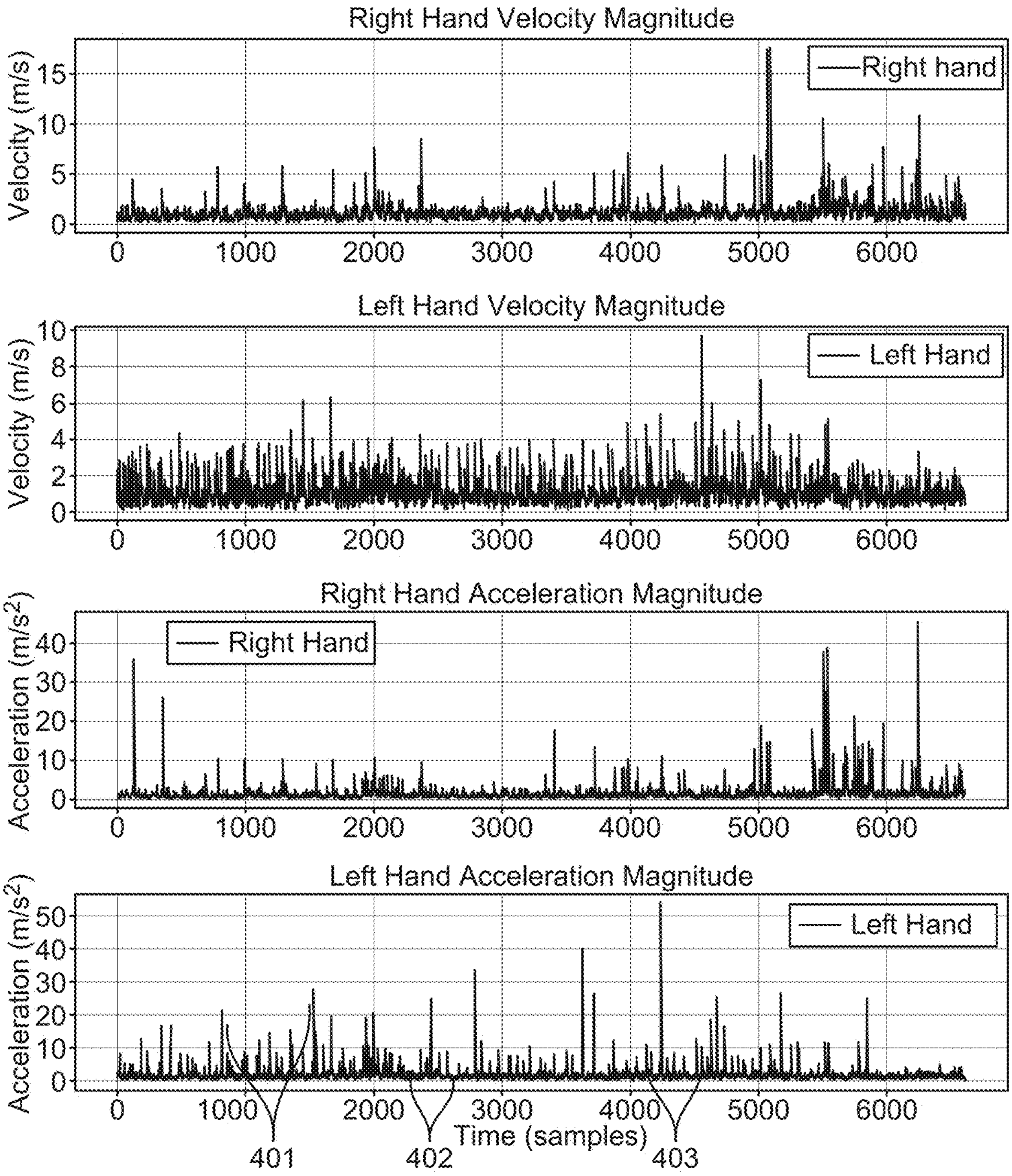
FIG. 4 shows plots of velocity and acceleration of a boxer's hands during a sparring session.

FIG. 4 gives an example of hand velocity and acceleration magnitude data of a boxer. A motion tracking software records hardware worn by two boxers in contest at data points 96 frames per second. This data and data of other body parts form a motion data system. The Action Points 401 point to two frame sections when the boxer's left hand was significantly accelerating. Other significant action points are easily identifiable on the graph and by the detailed values in 3D coordinates in the full data sheet. A wealth of information can be gathered through motion capture data and video processing. Later sections discuss methods to train AI MNNs. MNNs are AI networks defined by parameters that are iteratively updated through training, such that given motion states the MNNs generate motion outputs approximately similar to athletes who had given the training data. Passive Points 402 show when there's a relatively low amount of hand velocity and acceleration. Boxing tends to rapidly switch between passive state and active state. Other sports like basketball tend to have long stretches of active and passive states. Defensive Reaction Points 403 show the boxer acting in response to actions by the opponent. A MNN that generates a defensive action may also include input values from the opposing actor. For some sports such as basketball, offensive and defensive motion data can be clearly and easily segmented. MNNs then may be separately trained for each role. For other sports such as boxing, which has athletes constantly shifting between offense and defense, segmenting data may be difficult, and therefore a MNN may govern both offensive and defensive actions.

Figure 5:
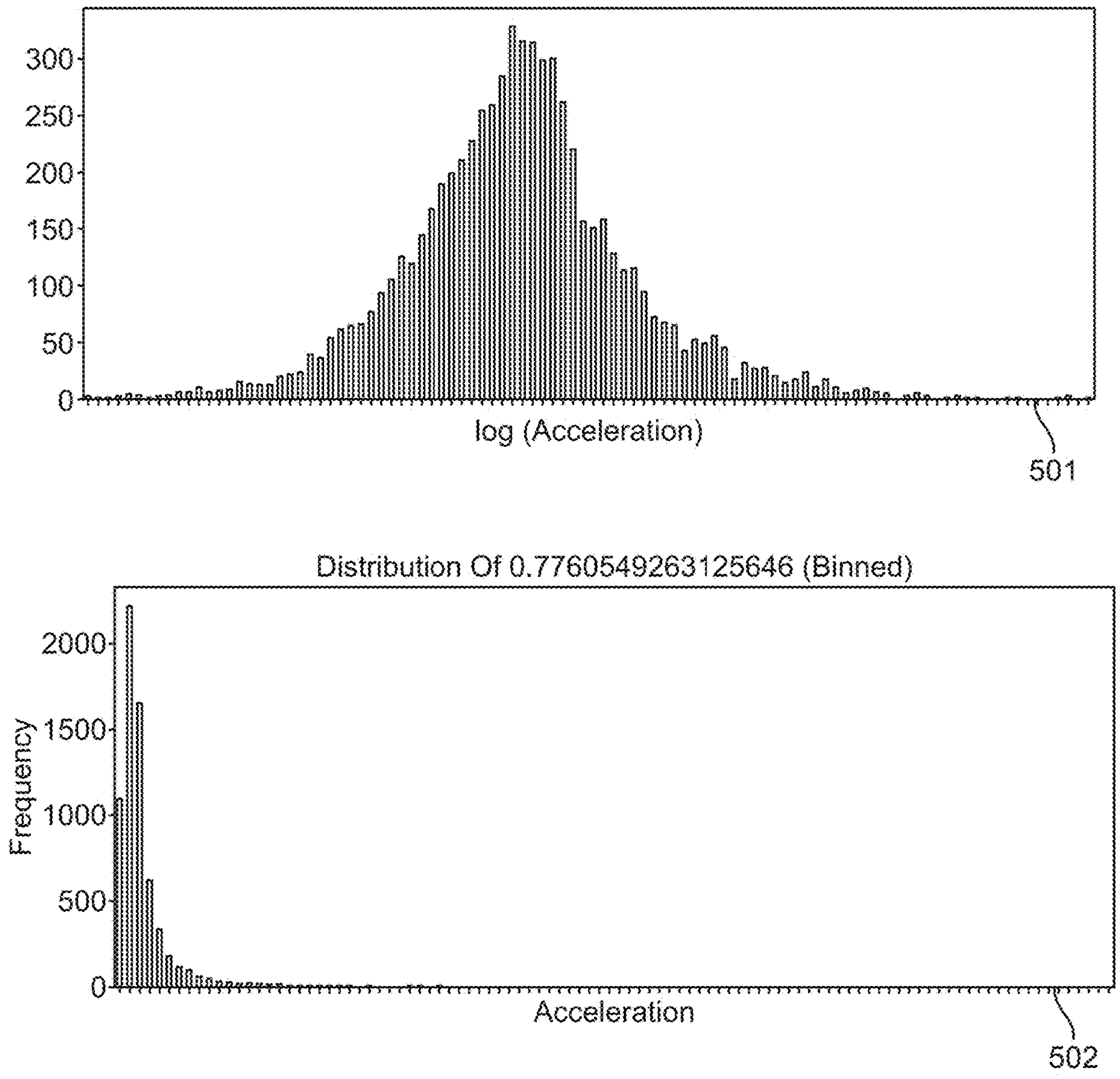
FIG. 5 plots the logarithmic-transformed distribution and normal distribution of a boxer's hand accelerations.
Figure 6:
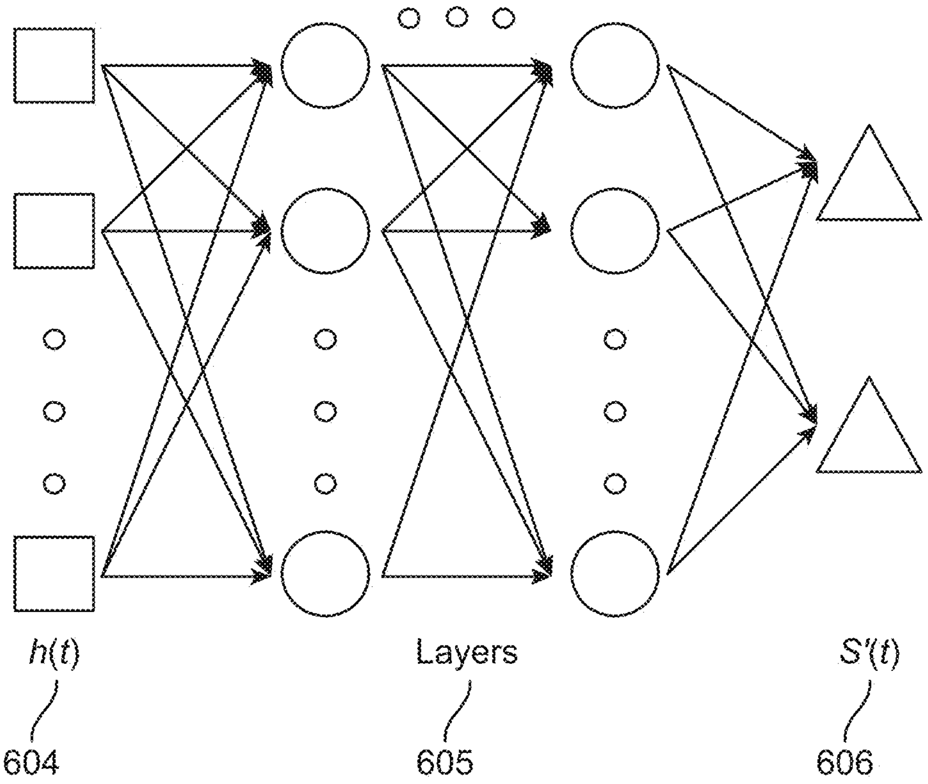
FIG. 6 is a continuous time ordinary differential equation and a decoder that translates it into real coordinates and vectors.

In sports systems, human bodies are mechanically incapable of long periods of high acceleration. Human contest sports are structured into periods of action and periods of lull. FIG. 5. Graph 501 Illustrates a distribution graph of log of acceleration magnitude of the boxer in FIG. 4. It is approximately a log-normal distribution. Graph 502 shows the same distribution without logarithmic transformation. The majority of movement points show low acceleration values, and distributions of high acceleration values are infrequent and not visible on graph without log transformation. However, these high accelerations represent active movement choices and are what makes human sports interesting and intelligent. The quick actions of punches are the quintessential movements for both viewers and athletes, not the lulls in between. AI networks trained on the entirety of the movement dataset may be dominated periods of slow passive movement which far outweigh the active movements in frequency and produce MNNs that are not as active as real athletes. Conversely, AI networks trained on the more active data segments may result in MNNs that are too active and do not realistically take rest periods like human athletes. Therefore, this invention teaches a hybrid modeling system with one or more MNNs that are trained on active data segments and one or more MNNs that are trained on passive data segments. Systems can define a partition or threshold value for velocity and acceleration, $v_p$ and $v'_p$ respectively. For the example in FIGS. 4 and 5, the mean of acceleration magnitudes is a reasonable threshold value for acceleration. A period of action begins when acceleration value of one or more body coordinates of a relevant character exceeds $v'_p$. If acceleration values are not available in the training data sheet, $$\frac{dv}{dt}$$

can be calculated by excel formulas. The end points of action periods may require definition specific to each sport. For example, ball sports can define an action period ending when game clock stops or when the ball object coordinates exceed some distance away from the primary actor. Combat sports can define an action period ending when the actors move apart greater than a set distance or when velocity and acceleration values remain less than threshold values for a certain number of frames. These definitions through excel formulas or code algorithms can partition the movement data into periods of active and passive movement. There can be some subjective judgement in the definitions, and adjustments of formulas and threshold values can affect active and passive MNN behaviors.

AI Neural Networks like Recurrent Neural Network (RNN) can maintain hidden states that encode short-term and long-term dependencies. However, most RNNs process data step-by-step. Because the majority of data as shown in FIGS. 4 and 5 are not decision points, a network that processes all time points can fail to model the decision-making processes of human athletes. Sports motions and choices are defined by acceleration vectors that are sporadic and sparse. Therefore, we model the active movement decisions in sports with a continuous-time ordinary differential equation (ODE) network 601. The change in hidden state h(t) over time is defined by a function F of the hidden state, an input I(t), time, and network parameters θ. Equation 1 lists a sequence of input data with context length l. The hidden state of a time $t_2$ is given by the integral function 602. When trained on active data partitioned as previously discussed, ODE network can accurately model +active decisions and high acceleration moves. Because ODE functions can be called with any time t, it can handle sparse data points and infer optimal movements at sparse times. Furthermore, differential equations are natural representations of movements as distance is integral of velocity, which is integral of acceleration. Diagram 603 shows a MLP decoder structure that maps a hidden state 604 through layers 605 and decodes to physical coordinates and vectors S(t) 606. User applications can use the output state to direct a virtual character or a robot.

Training ODE networks involves solving differential equations such that $\theta_{ODE}$ minimizes losses between observed and predicted states. Such solutions are available in public code libraries. Fixed step solvers like Euler's and Runge-Kutta are fast but may sacrifice accuracy. Implicit solvers like Backward Euler and Backward Differentiation Formula are stable over large changes in time but are computationally expensive. Adaptive-step solvers like Dormand-Prince switch between explicit and implicit methods and balance speed and accuracy. Because ODEs output a hidden state, and we have observed physical states in data, both parameters $\theta_{ODE}$ and $\theta_{MLP}$ are solved concurrently. Loss formula is given by Mean Square Error (MSE)

$$L(\theta_{ODE}, \theta_{MLP}) = \sum_{i=1}^{N} |S_{true}(t_i) - MLP(h(t_i)|^2 \quad 2$$

ODE solver and decoder are iteratively updated to learn the parameter through training loops. In other embodiments, additional parameters can be introduced to the ODE networks, such as a time decay constant. An additional term, –h(t)/T models the rate long-term dependencies in hidden state decays.

$$\frac{dh(t)}{dt} = -\frac{h(t)}{\tau} + F(h(t), I(t), t; \theta_{ODE}) \quad 3$$

While the action states immediately preceding the current time are the primarily determinants of an athlete's decisions, actions much earlier in the match may also inform the athlete's choices. The factor which measures the strength of decay depends on the sport and the capabilities that the system is modeling.

In addition to ODE MNNs which model active decisions, this invention uses fast and lightweight networks to model the less active periods in sports. Data segmentation discussed previously separate motion data into active and passive periods. The passive periods are defined by movements that lack significant decisions and large accelerations. In combat sports, the passive periods are the lulls between exchanges. In ball sports, players start an offensive play by carrying the ball some distance. Before the opposing team engages, the action of carrying the ball is rhythmic, ordinary, and predictable. To model these small or rhythmic actions, FIG. 7 shows the structure of a decoder-only Transformer network. Given an input 701 at time t with some context length, the Transformer 702 predicts the next frame of action states 703 in terms of coordinates and velocity vectors. Both the input and the prediction include states of relevant actors, in this case $S_1$, $S_2$. Transformers predict the next state using attention heads mechanisms, and states of both actors inform their future states. The system passes the predictions to Motion Controller Module 704. If there is no current active movement decisions, then the prediction is accepted, and the Physics Engine 705 finalizes the move in physical space. Note that $S_2$ is controlled by another MNN instance or a user. The $S_1$ MNN can predict $S_2$ but not directly control it. User Interface 706 receives the finalized move, and systems are updated to t+1. The goal of maintaining a fast network is to complete calculations and update states at a speed that is at least on pace with real progression of time. The user may be acting in real time against the system. Each action frame may be a small fraction of a second. Another goal is to update action states during periods when the system does not expect significant action, such that the actor controls by MNNs continue to move intelligently and realistically. Decoder Transformer and other networks are widely available in public literature. Other networks can also quickly model sequential states such as encoder-decoder Transformer, RNN, LSTM, etc.

Timeline 800 shows an example of action sequences in FIG. 4. data. Actor accelerates his left hand for 20 frames or 0.2 seconds in sequence 801. The hand decelerates in 802 after the arm reaches extension. About 60 frames after 802, his right hand accelerates 803 then decelerates 804. Actor moves away 805 in response to an action by the opposing actor. Actions continue after a two-second lull with another punch 806. An ODE MNN can accurately model the action behavior from sequence 801 to 805. The acceleration and deceleration of punches are strongly informed by the dependencies in the data. However, the system needs to recognize a passive MNN should govern the gap between 805 and 806. An ODE can remain silent but still maintain its hidden state through the time gap. Equation 807 shows a hazard head network Δ(t), named so because it was originally designed to model mortality events. It uses a MLP network to map the hidden state from ODE to a probability distribution of when the next sequence of significant action occurs. The hazard function with parameter $\theta_h$ can be structured as a softplus function 808 with a non-zero positive value. $W_h$, $b_h$ are parameters learned from training. Equation 809 shows the survival function, which calculates the probability an event hasn't occurred by time t. Equation 810 calculates the probability density function at time t. Training Loss function L uses the Maximum Likelihood Estimation with a Negative Log-Likelihood Loss function 811. A hazard function trained on sample data for example may estimate at time 805 that the next significant action has a normal distribution with likelihood of 2 to 5 seconds after, because the action states during 805 inform the hidden state that the two actors are moving further apart. While the increase in distance triggers the switch to Transformer passive movement network, Motion Controller Module receives the hazard probability distribution which informs it when to trigger the next ODE calculation and return to active movements.

Figure 9:
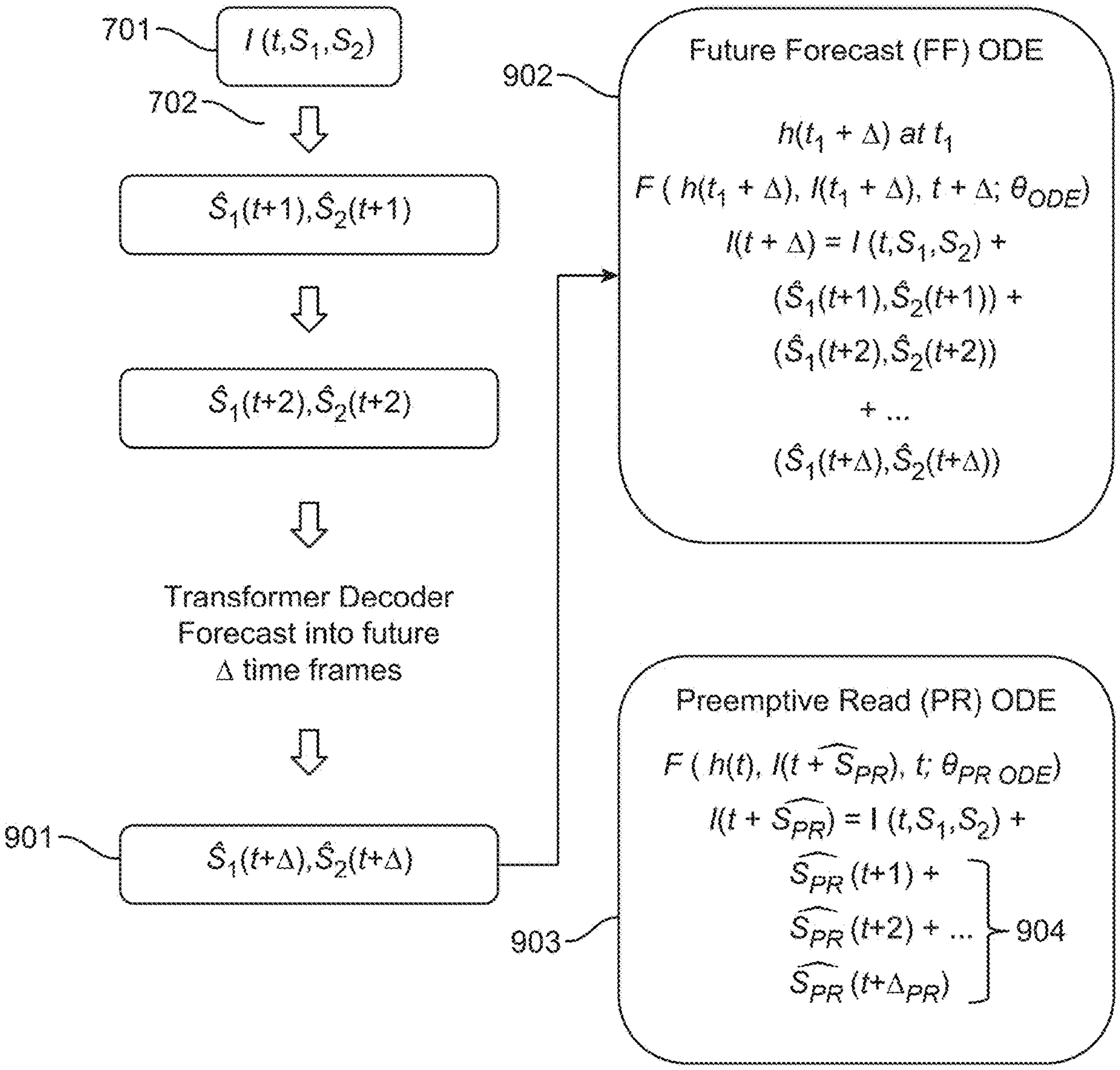
FIG. 9 shows equations and diagrams of networks that consider future action states.

This invention is designed to infer intelligent movement decisions in real time. However, some advanced MNN structures may require complex calculations that cannot be completed in real time with typical consumer hardware. FIG. 9 shows the structures of Future Forecast (FF) MNNs. An input sequence at time t 701 is processed through the decoder MNN 702 as discussed in FIG. 7. This process continues and forecasts into the future for A time frames. Because each decoder MNN loop can be processed faster than one time frame in real time, the system forecasts the future states 901 and calculates the Future Forecast (FF) ODE MNN at t+A 902 when real time progresses to t'. This allows t+Δ−t' time to complete an advanced MNN. In the example in FIG. 4, motion data is captured at 96 frames per second. If the system receives data with latency similar to human reflexes, which is delayed by 100 to 200 ms, then the system still needs to execute movement decisions at (1/96) 10 ms per frame. The number of parameters in the above example is between 100 to 500 depending on the setting, a very small number in the field of machine learning. An affordable personal computer can process each decoder inference step between 0.1 to 1 ms. Then, forecasting 10 frames into the future gains at least 90 ms ahead of real time progression, a comfortable margin for an extended ODE calculation. Forecasting error with Transformer is proportional to the number of time frames forecasted, and human physical states change little during 100 ms. Therefore, the expected states when A is small are good approximations of real states when time progresses to that point. FF MNN effectively gains time for deeper decision calculations.

Forecasting into future frames is a method to model human decision making when the consumer inference hardware may not match the processing speed of human brains. However, human athletes also look into the future for decisions. In sports terms, it is called a feint, a read, a setup, anticipating the opponent, or a preemptive counter. FIG. 9 also shows another Future Forecast method, Preemptive Read (PR) ODE 903. With states forecasted by Transformer networks, PR ODE uses input states from past, present, and future states 904. PR ODE can be trained on the same data, but input edited to include future states of other actors. Hidden state is trained to maintain future dependencies as well as the past.

Methods here show multiple MNNs that can separately or simultaneously give movement proposals to Motion Controller (MC). MC can decide based on the state of match whether to choose an ODE movement which is more likely to be high acceleration or to choose a Transformer which flows into the next state without large acceleration changes. In highly active segments, Transformer networks can make short-term future forecasts to allow ODE networks the time to calculate in pace with real time usage. MC module communicates with user interface and receives state updates from actors not directly controlled by the MC. Other actors can also initiate active MNNs with vectors that trigger defensive actions and a switch to ODE networks. Other MC methods specific to each sport such as rewards and scorings are beyond the scope of this invention. Sports game controls are well established and can be publicly sourced to provide additional Motion Control. Both game coding and AI reward functions are available in the public domain.

What is claimed is:

1. A system of Artificial Intelligence (AI) Motion Neural Networks (MNNs) to generate movement decisions based on past, current, and expected future movements, comprising:

at least one localized or server computerized device containing at least one software application, wherein said at least one localized or server computerized device includes one or more processors and a memory;

said at least one localized or server computerized device in communication via a network with one or more input, output, and display devices;

said memory in communication with the one or more processors and data storage devices, the memory storing instructions that, when executed by the one or more processors, are configured to cause the software application to:

i. process historical video and sensor data of real and simulated games into training data of body parts of actors in 3-dimensional space defined by location coordinates, velocity, and acceleration vectors over time;

ii. partition said training data into periods of relatively high activity and relatively low activity, with relatively high activity defined by data values greater than a certain velocity, greater than a certain acceleration, less than a certain distance between actors, or any combination of said factors, and with relatively low activity defined by data values less than a certain velocity, less than a certain acceleration, greater than a certain distance between actors, or any combination of said factors;

iii. train neural networks on said relatively high activity data and neural networks on said relatively low activity data, said trained neural networks structured and parameterized such that given a real or simulated game or motion system, said neural networks receive coordinates, velocity, and acceleration vectors of an actor being controlled by said neural networks and other actors in contest against or partnership with said controlled actor and output movement directions including a new motion state of coordinates and vectors to direct movements of said controlled actor;

iv. minimize the average difference between said movement directions generated by said neural networks and real movement directions in said training data by iteratively updating said neural networks parameters with training algorithms; and v. select between said neural networks trained on said relatively high activity data and said neural networks trained on said relatively low activity data depending on movement directions generated by said neural networks trained on said relatively high activity data and said neural networks trained on said relatively low activity data, game clock, distance between actors, hazard head function probability, an input of high activity data from other actors, or any combination of said factors.

2. The system of AI MNNs to generate movement decisions set forth in claim 1, wherein said neural networks trained on said relatively high activity data use an ordinary differential equation (ODE) network that takes an input sequence of movement data, time, and a hidden state and models changes to said hidden state over time as differential equations.

3. The system of AI MNNs to generate movement decisions set forth in claim 2, wherein said ODE network includes a time decay constant that modifies its hidden state where movements are encoded into past dependencies and decays said hidden state with a factor learned and parameterized from training.

4. The system of AI MNNs to generate movement decisions set forth in claim 2, wherein said changes in hidden state over time represents movement states of actors internally to said ODE network and said ODE network translates said hidden state changes via a decoder network to changes in coordinates and vectors.

5. The system of AI MNNs to generate movement decisions set forth in claim 2, wherein said ordinary differential equation network hidden state maps via a learned network to a hazard head equation that approximates a likelihood function of when a next period of relatively high activity will occur in the future.

6. The system of AI MNNs to generate movement decisions set forth in claim 1, wherein said neural networks trained on said relatively low activity data uses a transformer decoder network that applies an attention mechanism to previous states of coordinate locations and velocity vectors to predict the next state of movement coordinates and velocity vectors.

7. The system of AI MNNs to generate movement decisions set forth in claim 6, wherein said transformer decoder network iteratively forecasts next states at a processing speed faster than real time progress of said system such that a time gap exists between real system time and forecasted state time, and said forecasted states are used as inputs in MNNs.

8. The system of AI MNNs to generate movement decisions set forth in claim 7, wherein a MNN calculates a movement decision with said forecasted next states and said forecasted state time such that said movement decision is ready for execution when real time progresses to said forecasted state time.

9. The system of AI MNNs to generate movement decisions set forth in claim 7, wherein said forecasted next states are used as additional inputs into preemptive read ODE networks that encode future dependencies as well as past and present dependencies into a hidden state and outputs movement decisions that anticipate future actions of other actors.

10. A system of Artificial Intelligence (AI) Motion Neural Networks (MNN) to generate movement decisions based on past, current, and expected future movements, comprising:

at least one localized or server computerized device containing at least one software application, wherein said at least one localized or server computerized device includes one or more processors and a memory;

said at least one localized or server computerized device in communication via a network with one or more input, output, and display devices;

said memory in communication with the one or more processors and data storage devices, the memory storing instructions that, when executed by the one or more processors, are configured to cause the software application to:

i. process historical video and sensor data of real and simulated games into training data of body parts of actors in 3-dimensional space defined by location coordinates, velocity, and acceleration vectors over time;

ii. partition said training data into periods of relatively high activity and relatively low activity, with relatively high activity defined by data values greater than a certain velocity, greater than a certain acceleration, less than a certain distance between actors, or any combination of said factors, and with relatively low activity defined by data values less than a certain velocity, less than a certain acceleration, greater than a certain distance between actors, or any combination of said factors;

iii. train an ordinary differential equation (ODE) network on said relatively high activity data, said ODE network configured to take an input sequence of movement data, time, and a hidden state and to model changes to said hidden state over time as differential equations;

iv. train a transformer decoder network on said relatively low activity data, said transformer decoder network configured to apply an attention mechanism to previous states of coordinate locations and velocity vectors to predict a next state of movement coordinates and velocity vectors;

v. minimize an average difference between movement directions generated by said ODE network and said transformer decoder network and real movement directions in said training data by iteratively updating parameters of said ODE network and said transformer decoder network with training algorithms; and vi. select between said ODE network and said transformer decoder network depending on movement states generated by said ODE network or said transformer decoder network, game clock, distance between actors, hazard head function probability, an input of high activity data from other actors, or any combination of said factors.

* * * * *